S. T. HARKER.
ANTI-FREEZING COCK.
No. 169,694. Patented Nov. 9, 1875.
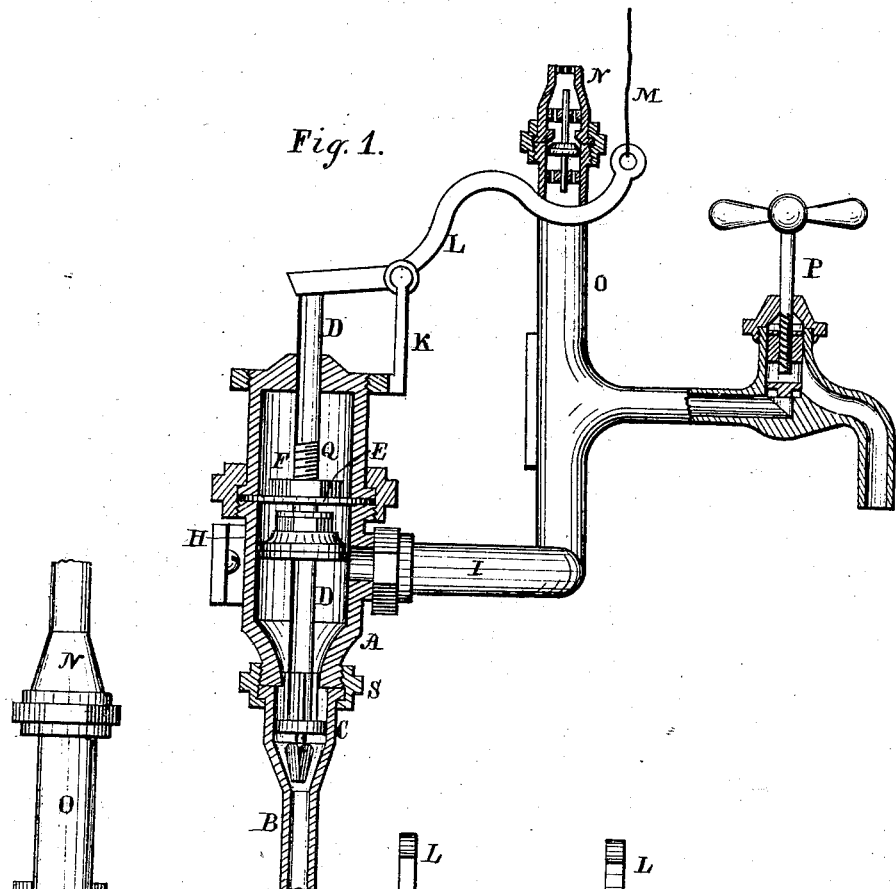
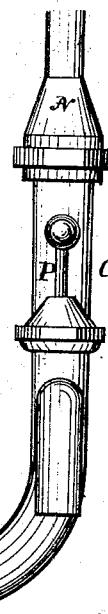
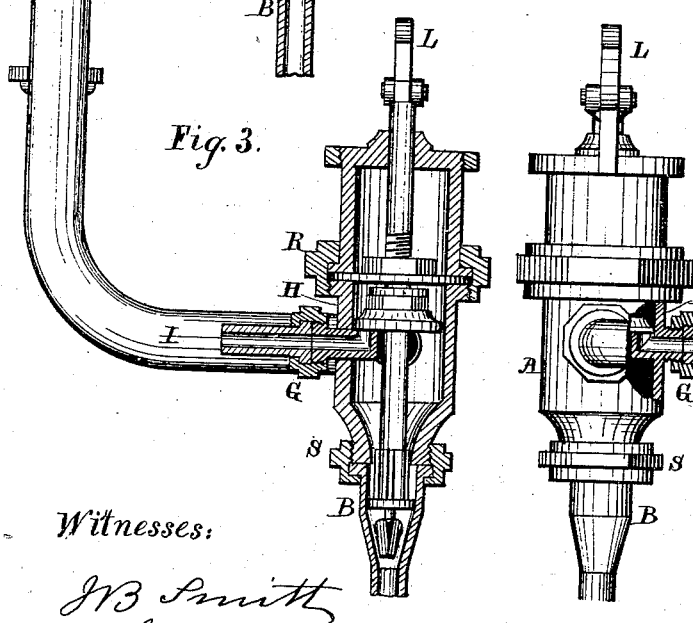
Witnesses:
J B Smith
A. Schattenberg
Inventor:
Sam. T. Harker.

UNITED STATES PATENT OFFICE.

SAMUEL T. HARKER, OF MILWAUKEE, WISCONSIN.

IMPROVEMENT IN ANTI-FREEZING COCKS.

Specification forming part of Letters Patent No. 169,694, dated November 9, 1875; application filed March 22, 1875.

*To all whom it may concern:*

Be it known that I, SAMUEL T. HARKER, of Milwaukee, in the county of Milwaukee, in the State of Wisconsin, have invented certain Improvements in Anti-Freezing Cocks, of which the following is a specification:

My invention has for its object the safety of water-pipes from freezing in cold weather. It is a cock to be placed in a pipe in a cellar or under ground, where the frost will not reach it, the valve of the cock being closed by the force of the water, and a waste-pipe in connection with the same opened with a wire or rope passing from wherever the water is wanted to be drawn, running to the lever which strikes on the end of the stem of the valve, which, when the wire is pulled, forces the valve back and closes the waste-pipe; and the water is then forced along through the pipe to the faucet, and when the faucet is opened the water passes through it; and when the wire is let go the valve of the cock is closed and opens the waste-valve, and the water runs through the waste-opening to the wasteway, a valve in the upper end of the pipe is opened by the suction of the water escaping, and thus gives vent to the pipe, and the pipe is emptied and cannot freeze.

Figure 1 is a sectional view of my invention, and Fig. 2 is a sectional view of the waste-opening; Fig. 3, a reversed sectional view of Fig. 2.

A is the cock-case, placed in the pipe in the cellar or under ground, where it will not freeze; B, the pipe from the water-main, and connected with the cock; C, the valve which lets the water through the cock; D, valve-stem; E, diaphragm, which prevents the water from passing out round the valve-stem, and secured to the valve-stem by a nut, F, which is screwed onto the valve-stem, and confines the diaphragm onto a stop on the valve-stem; H, stop on the valve-stem, which closes the waste-opening I, when the valve C is opened; K, a fulcrum for lever L; M, wire pull attached to lever L at one end, and the other end with a ring on it up in the house, with which to pull on to open the valve; N, a valve on the upper end of the pipe, acting as a vent to the pipe when the water is running back out of the pipe; O, the pipe leading from the cock; P, faucet through which to draw water; Q, a screw on the valve-stem D; R, a screw-coupling, which holds the cap of the cock-case on, and also secures the diaphragm-edges between it and the case; S, coupling to secure pipe B to case A.

The operation of this cock is as follows: The cock is placed on the pipe, as shown in the drawings. A person wishing to obtain water takes hold of the ring on wire M, and pulls on it; that pulls on the outer end of lever L, which forces the other end of the lever onto the valve-stem D, and closes the waste-valve H, and opens the supply-valve C; and the water is then forced through the pipe O, and closes the valve N, and the water can be drawn through faucet P; and when water enough has been drawn let go of the ring, and the valve C will be closed and valves G and N opened, and the water will run out through the wasteway I.

I claim as my invention—

1. Cock-case A, valve C, valve-stem D, diaphragm E, wasteway I, and valve H, all in combination, substantially as described.

2. The pipe O, valve N, in combination with waste-pipe I and valve H, substantially as and for the purpose set forth.

SAML. T. HARKER.

Witnesses:
J. B. SMITH,
E. J. SMITH.